US008444897B2

(12) United States Patent
Reaveley et al.

(10) Patent No.: US 8,444,897 B2
(45) Date of Patent: May 21, 2013

(54) BLENDING PLASTIC AND CELLULOSE WASTE PRODUCTS FOR ALTERNATIVE USES

(75) Inventors: Lawrence D. Reaveley, Salt Lake City, UT (US); Mark Bryant, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 107 days.

(21) Appl. No.: 12/442,522

(22) PCT Filed: Oct. 30, 2007

(86) PCT No.: PCT/US2007/082987
§ 371 (c)(1),
(2), (4) Date: Feb. 26, 2010

(87) PCT Pub. No.: WO2008/055149
PCT Pub. Date: May 8, 2008

(65) Prior Publication Data
US 2010/0144905 A1    Jun. 10, 2010

Related U.S. Application Data

(60) Provisional application No. 60/863,562, filed on Oct. 30, 2006.

(51) Int. Cl.
*B29C 47/00* (2006.01)
(52) U.S. Cl.
USPC ............ 264/177.2; 524/702; 44/504; 44/589; 44/605
(58) Field of Classification Search
USPC ........... 518/702; 44/504, 589, 605; 264/177.2
See application file for complete search history.

(56) References Cited

U.S. PATENT DOCUMENTS

| 3,561,377 | A | | 2/1971 | Amundsen |
| 4,044,695 | A | | 8/1977 | Mackenzie et al. |
| 4,844,351 | A | | 7/1989 | Holloway |
| 5,128,174 | A | * | 7/1992 | Brotz ............................ 427/528 |
| 5,375,777 | A | | 12/1994 | Pehrson |
| 5,407,817 | A | | 4/1995 | Lightsey et al. |
| 5,427,650 | A | | 6/1995 | Holloway |
| 5,435,954 | A | * | 7/1995 | Wold ............................ 264/115 |
| 5,465,847 | A | | 11/1995 | Gilmore |

(Continued)

OTHER PUBLICATIONS

Schroeter et al, Melting Cellulose, 2005, Cellulose vol. 12 pp. 159-165.*

(Continued)

*Primary Examiner* — Jacob Thomas Minskey
(74) *Attorney, Agent, or Firm* — Workman Nydegger

(57) ABSTRACT

The present invention relates to methods for reclaiming plastics and cellulose materials for use in a variety of applications, including as alternative fuel sources. According to one embodiment of the invention, waste is received which includes cellulose materials and plastics. Such materials are sorted from other materials and the cellulose and plastic materials are shredded or ground and then blended together. The blended materials can then be fed to an energy converter, such as a combustion unit or a gasifier, where they are burned as fuel source or used to create synthetic gas. In other embodiments, the blended materials are heated or have a binding element added thereto. Such mixture is then compressed to form a desired shape or sized object, and that object can then be packaged, distributed or used. The blended object can be used as a fuel source, or as a building, sound attenuation, or insulation material.

10 Claims, 4 Drawing Sheets

U.S. PATENT DOCUMENTS

| | | | |
|---|---|---|---|
| 5,506,123 A | 4/1996 | Chieffalo et al. | |
| 5,755,836 A * | 5/1998 | Beyer | 44/535 |
| 5,849,964 A * | 12/1998 | Holighaus et al. | 585/241 |
| 6,238,516 B1 * | 5/2001 | Watson et al. | 162/8 |
| 6,328,234 B1 | 12/2001 | Saucier et al. | |
| 6,686,556 B2 | 2/2004 | Mitchell | |
| 6,849,215 B2 | 2/2005 | Khait | |
| 7,263,934 B2 | 9/2007 | Copeland et al. | |
| 8,034,132 B2 | 10/2011 | Lee et al. | |
| 8,133,716 B2 | 3/2012 | Shin | |
| 2001/0000870 A1 * | 5/2001 | Chandaria | 126/540 |
| 2001/0013197 A1 * | 8/2001 | White | 44/552 |
| 2002/0134043 A1 * | 9/2002 | Winterfeld | 52/729.5 |
| 2005/0080520 A1 | 4/2005 | Kline et al. | |
| 2006/0006564 A1 | 1/2006 | Maidas et al. | |
| 2007/0112577 A1 | 5/2007 | Bohlig et al. | |
| 2007/0256382 A1 * | 11/2007 | Drolet | 52/439 |
| 2008/0166184 A1 | 7/2008 | Wu | |
| 2009/0008298 A1 | 1/2009 | Studley | |
| 2011/0230699 A1 | 9/2011 | Reese | |

OTHER PUBLICATIONS

International Search Report from PCT/US2007/082987, dated May 13, 2008, 2 pages.

Written Opinion from PCT/US2007/082987, dated May 13, 2008, 5 pages.

International Preliminary Report on Patentability from PCT/US2007/082987, dated May 13, 2008, 6 pages.

* cited by examiner

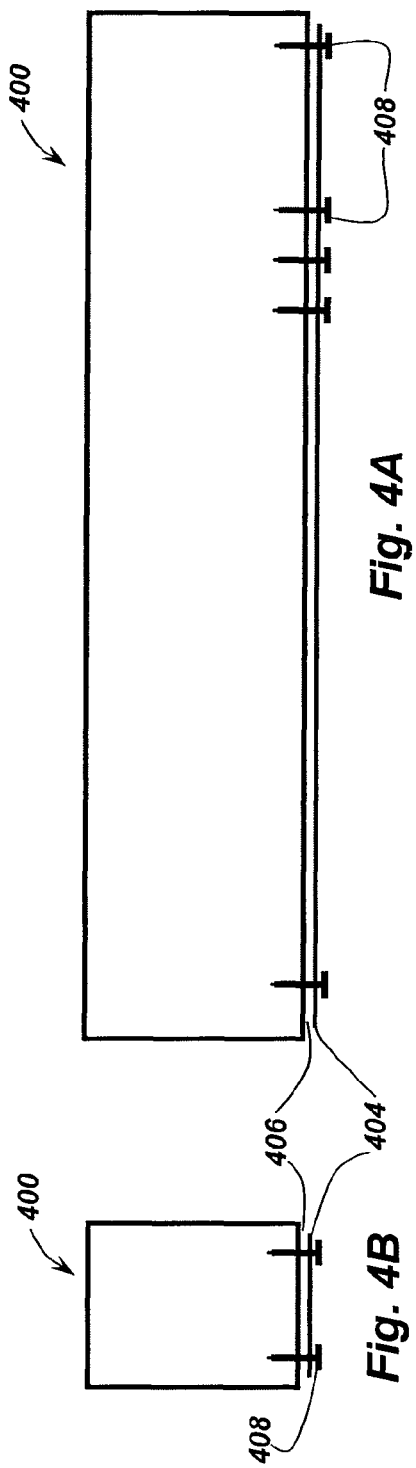
*Fig. 4A*
*Fig. 4B*
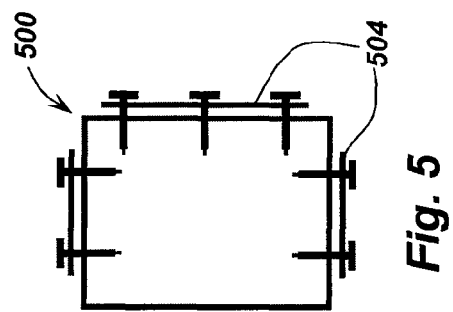
*Fig. 5*

BLENDING PLASTIC AND CELLULOSE WASTE PRODUCTS FOR ALTERNATIVE USES

CROSS-REFERENCE TO RELATED APPLICATIONS

The present applications claims the benefit of, and priority to, U.S. Provisional Application Ser. No. 60/863,562, filed on Oct. 30, 2006, and entitled "Blending Plastic and Cellulose Waste Products for Alternative Uses", which application is expressly incorporated herein by this reference.

BACKGROUND OF THE INVENTION

1. The Field of the Invention

Exemplary embodiments of the invention relate to the field of reusing recyclable materials. More particularly, the invention relates to methods and processes for converting plastic and cellulose-based materials into alternative fuel mediums and/or structural products.

2. The Relevant Technology

Each day, millions of products are discarded by individuals, families, municipalities, and various industries within the consuming public, thereby also creating thousands, if not millions, of tons of various plastic and organic waste byproducts. At the same time, landfill capacity is diminishing, thereby creating future disposal problems. Composting and incineration can be used to help remedy these disposal problems, but both options have some limits in their overall feasibility. Composting, for example, requires less general space than a landfill, but the composting process takes time to work and can generally be used for only certain types of waste byproducts. Incineration, another alternative which is available for a wider range of waste byproducts, can create exhaust fumes which may be damaging to the ozone layer. Moreover, when byproducts are incinerated, the heat generated is usually lost and not put to use in generating heat or other energy that can be used by homes, businesses, and the like.

Such difficulties, along with waste management costs, promote an increasing interest in recovering and reclaiming such waste products for environmentally safe practices. As such, there is tremendous activity intent on developing alternative processes and treatment technologies to manage non-hazardous wastes. Therefore, it would be beneficial to develop a process that can efficiently and cost effectively convert multiple types of waste byproducts into useful materials usable for: (i) heat and/or energy generation; and/or (ii) structural, sound attenuation, and/or insulation materials.

BRIEF SUMMARY OF THE INVENTION

Exemplary embodiments of the invention relate to processes for reclaiming waste byproducts, such as plastics and cellulose-based materials, and converting them into structural or insulation materials, or into materials which can be used as, or for creation of, fuel.

According to one embodiment of the present invention, a process for generating an alternative fuel source is described. In such an embodiment, solid waste is received. Plastics and/or cellulose-based materials are received in the solid waste stream and can be sorted from other waste materials. The cellulose and plastic materials are sanitized and are blended together to form a blended mixture of reclaimed materials. This blended mixture can have virtually any desired consistency and composition. For example, plastic may comprise between one and ninety-nine percent of the composition, while cellulose materials can comprise between one and ninety-nine of the composition. Any such combination of shredded or ground particles can then be fed to an energy converter.

According to one embodiment, the cellulose and/or plastic materials are also shredded or ground to smaller particles, and such may occur before or after blending the materials. For instance, the materials may be shredded or ground into pellet-sized particles and/or into a powder. Those pellets or the powder may then be fed into the energy converter.

In one aspect of the invention, the energy converter can be combustion based, and can include a heating unit such as a boiler, furnace, stove, or fluidized-bed combustion unit. In another combustion-based example, the blended materials may be used as a fuel to supplement coal in any energy generating combustion process. In this manner, coal may be used as a complementary addition to the blended plastic and cellulose fuel described herein.

In another aspect, the energy converter can be a gasifier. In the gasifier, the blended mixture of plastic and cellulose is used to create a synthetic gas. The synthetic gas then undergoes an additional conversion where it is used to create diesel or an alcohol-based product such as ethanol, methanol, or a mixed alcohol. Such products can then be burned and may be burned cleaner and more efficiently than if the blended mixture of cellulose and plastic were itself burned. For example, consumption of synthetic gas, and/or products derived from the synthetic gas, may produce more energy per pound that by simply burning the blended materials alone (e.g., the number of BTU's per pound is increased).

To reduce any impact on the climate, one or more additional materials can be added to the mixture. For example, a gas suppressant such as crushed limestone, lime, clay materials, burnt clay materials, and/or inorganic fine materials can be added to the blended mixture before the mixture is sent to the energy converter. If the blended mixture is then burned, noxious or toxic gas emissions can be reduced. The added materials may suppress gasses that would otherwise be emitted from the blended mixture itself, or from other materials burned with the blended mixture. For instance, when the plastic and cellulose fuel is burned in conjunction with coal, the added gas suppressants can suppress gasses that would be emitted from the burning of the coal and/or the burning of the plastic and cellulose fuel.

In some aspects, the blended mixture can also be compressed to form a desired shape before being passed to an energy converter. For instance, the mixture may be compressed to form bricks, logs, briquettes, pellets, or objects of another desired shape. Optionally, the mixture is also heated before being compressed.

According to another aspect of the present invention, a process for reclaiming waste by-products is described. Such process may reclaim the waste and be used to generate not only alternative fuel sources, but also building materials, sound attenuation materials, insulation materials, or other structural materials. In such an embodiment, solid waste is received and can optionally be sorted in any level of granularity. For example, cellulose materials and plastic materials can be separated from other types of materials. Optionally, such materials are also sanitized and/or shred or ground into small particles. For example, the materials may be ground into pellet-sized materials or into powder-sized particles. Before or after shredding the materials, the plastic and cellulose materials can be blended together. Any other added materials (e.g., binding agents, gas suppressants, additives, strengthening agents, etc). may optionally also be blended with the plastic and cellulose. After blending, the blended mixture may be formed into a desired shape. Forming the blended mixture into the desired shape can include heating the blended mixture. Thereafter, the mixture can be compressed to form a desired shape. For example, compressing the material can include shaping, molding, and/or extruding the material to the desired shape.

If the mixture is not heated, or even in some embodiments in which the mixture is heated, a binding agent may also be mixed into the blended mixture of plastic and cellulose materials. In some embodiments, the compressed, molded, shaped, and/or extruded material can also be cooled as well as cut to a particular size, either before or after cooling. The object is then packaged or otherwise prepared for use. Such materials can be formed as logs, pellets, bricks, briquettes, or in other shapes for use as a heating element in a stove. Alternatively, such materials can be formed for use as a structural members such as: fence posts, parking chucks, building materials, posts, beams, decking, joists, paneling, studs, columns, wall panels, siding, flooring, sheathing, retaining walls, roadway sound walls, walkways, driveways, erosion control coverings, dams, marine structures, wharfs, docks, landscaping edging, railway ties, seismic resistant wall structures, furniture, or any other suitable structural material. The material can also be used as an insulation material or sound attenuation material.

According to other aspects, the blended material is strengthened or reinforced. Such strengthening and/or reinforcement can occur at any time. For example, the object can be reinforced during compression of the object, when the object is compressed to a desired shape. In one example, a groove or hole is formed in the formed object. Such a feature strengthens the material as the groove or hole can then receive a reinforcement structure such as a rod or plate therein. For instance, one or more grooves and/or holes can be formed which then receive a rod that strengthens or otherwise changes the material properties of the blended object. In another example, a plate is affixed within the groove or hole and/or against an interior or exterior surface of the blended object. A reinforcing rod, bar, plate, board or beam can be made of any suitable material, such as iron, steel, wood, or fiber reinforced glass/carbon composite materials. Additionally, any combination of such reinforcements may be used, such that a particular object may have one, two, three or more supports any or all of which can be different materials so as to improve or provide a desired mechanical property.

The rod, plate, or other reinforcement structure may be affixed to the blended object at any time. For instance, the reinforcement structure may be inserted at the time of manufacturing or at a much later time, such as when being used by the end-user. In one example, a reinforcement structure is attached during the formation of the blended object. For instance, the blended object can be strengthened by adding the reinforcement structure after heating and compressing of the mixture, but before the object cools. A fastener may be used, for example, to secure the reinforcement structure to the blended object while the object is still hot or warm. In such a case, the fastener may be more easily installed because of the ease of penetrating the warm object. In some cases, securing the reinforcement structure to the blended object while the object is hot or warm may allow the plastic, cellulose and/or other elements of the blended object to adhere to the reinforcement structure, thereby affixing the reinforcement structure even without any additional and separate adhesives or fasteners. In other cases, it may merely allow for a reduced use of adhesives or fasteners.

Reinforcement structures may, however, be added at any time. For instance, a reinforcement structure can be added to the blended mixture even before, or during heating and/or compression of the blended mixture. For instance, strands of fiberglass can be added to the mixture to strengthen the formed object. The fiberglass or other strengthening structures can, for example, improve the tensile or compressive strength of a material, and/or improve the ability of a formed object to maintain its integrity while a torque is applied.

These and other objects and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIGS. 4A and 4B illustrate side and frontal views, respectively, of a example beam which may be produced of recycled plastic and cellulose material, and which is reinforced along one surface of the beam; and FIG. 5 illustrates a frontal view of another example beam produced of recycled plastic and cellulose material, and which is reinforced along three surfaces of the beam.

DETAILED DESCRIPTION OF EXAMPLE EMBODIMENTS

Exemplary embodiments of the invention relate to processes for reclaiming waste byproducts, such as plastics and cellulose-based materials, and converting them into structural or insulation materials, or into materials which can be used for heat and/or energy generation. A process according to the present invention can include blending plastic and cellulose-based materials which are thereafter optionally heated, bound, or provided to an energy converter such as a heat generator or gasifier. Heated materials are, in some embodiments, compressed or otherwise formed into structural or insulative materials, or into solid alternative fuels, which can then be used for a variety of applications.

Reference will now be made to the drawings to describe various aspects of exemplary embodiments of the invention. It is understood that the drawings are diagrammatic and schematic representations of such exemplary embodiments, and are not limiting of the present invention, nor are any particular process elements to be considered essential for all embodiments or that process elements be performed in any particular order. No inference should therefore be drawn from the drawings as to timing or necessity of any element. In the following description, numerous specific details are set forth in order to provide a thorough understanding of the present invention. It will be obvious, however, to one of ordinary skill in the art that the present invention may be practiced without these specific details.

Additionally, reference is made herein to cellulose materials or cellulose-based materials. It will be understood that such terms are to be interpreted broadly to include any material which includes, in whole or in part, cellulose. For example, cellulose materials include plants and any plant-based material including, by way of representation and not limitation, fibrous products such as paper, textiles, wood, wood pulp, and the like. In a broad sense, cellulose can be interpreted to include any material which includes insoluble fibers or complex carbohydrates.

Figure 1:
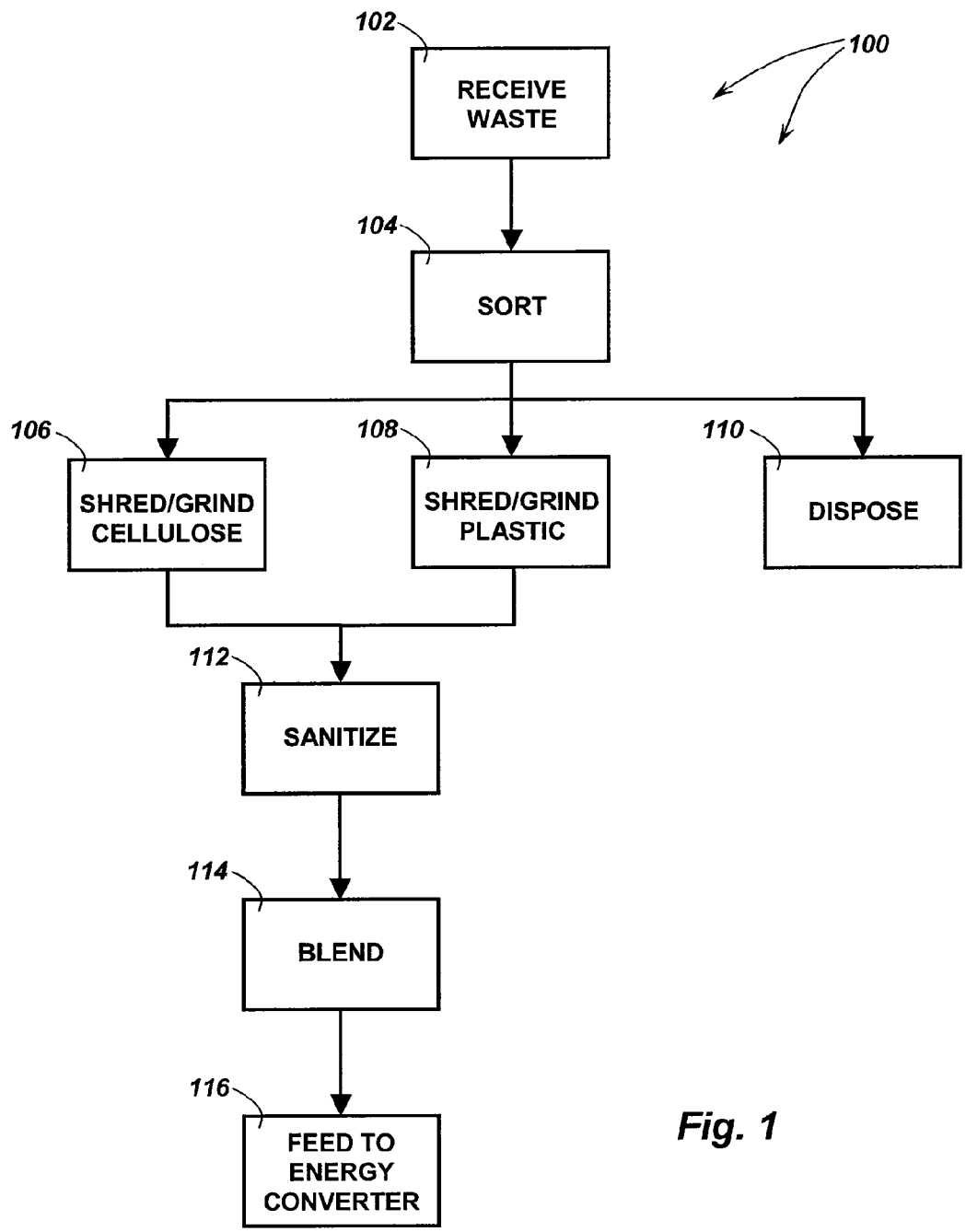
FIG. 1 illustrates an exemplary method for reclaiming plastic and cellulose materials for use as an energy source in an energy converter such as a heat generator or gasifier.

FIG. 1 illustrates an exemplary embodiment of a process 100 for blending plastic and cellulose materials in a manner that allows the blended composition to be used as a fuel source for a heat generator. In particular, FIG. 1 illustrates an exemplary reclaiming process 100 in which waste is received (act 102), and in which the received waste includes, at least in part, solid waste materials in the form of plastic and/or cellulose materials. In act 102, waste can be received in any suitable manner. For example, waste can be received in a municipal solid waste stream. For example, solid waste received at a landfill can thereafter be processed in accordance with reclaiming process 100. In other embodiments, municipal waste is received and processed before it is provided to a landfill. In still other embodiments, waste is received from one or more private, non-municipal sources or streams including, by way of example, as part of a waste stream generated by an entity performing reclaiming process 100. For instance, a single high-volume retailer (or multiple high and/or low-volume retailers) may utilize exemplary reclaiming process 100 in connection with plastic bags, plastic hangers, plastic bottles, shrink wrap, promotional literature, wooden pallets, and other discarded items. In other embodiments, solid waste can be received from multiple municipal and/or non-municipal waste streams, and cellulose materials and plastics can be received in the same or different waste streams.

Upon receiving waste, the waste can subsequently be sorted (act 104) into any of various constituent components, in any degree of granularity. For example, according to one embodiment process, such as that illustrated in FIG. 1, the received waste can be sorted into three components, namely plastics, cellulose materials, and other materials. It will be understood, however, that other degrees of granularity can be achieved when sorting 104 the received waste. For example, cellulose and plastic materials can be collectively sorted into a single bin or as a single component, or different types of plastic materials and/or different types of cellulose materials may be further separated. Moreover, other waste products can be separated into still other components. By way of example, recyclable materials such as metals can be sorted collectively or as individual components, hazardous materials can be sorted as a separate component, composite materials can be separated further, organic, non-cellulose bio-waste can be separated as a component, and the like.

According to the illustrated embodiment, the sorted waste byproducts are then passed to one or more shredding/grinding processes (acts 106, 108) or are disposed of (act 110) in some other manner. For instance, materials which are not sorted out as cellulose or plastics can be disposed of in a suitable manner. It should be appreciated that disposal of such other materials may include sending them to a landfill, but does not require such disposal. Indeed, in a broad sense, disposal 110 can include any act which results in removal of the materials from further processing in reclaiming process 100. For example, other methods for disposing of such materials (act 110) can include incinerating the materials, sending the materials to a composting pile or recycling center.

As reflected in FIG. 1, and as noted above, cellulose materials and plastic materials may not be disposed of, and can instead be shredded or ground (acts 106, 108) into smaller particles. Grinding and/or shredding (acts 106, 108) of the cellulose materials and plastics can be performed in any suitable manner. For instance, in one example embodiment, such materials are crushed to form pellet-sized materials. In another embodiment, such materials are pulverized so as to produce powder-sized particles. In some embodiments, cellulose is shredded or ground (act 106) to a size and/or in a manner similar to the shredding or grinding (act 108) of plastic materials. In other embodiments, however, the size of the shredded/ground plastic and cellulose is substantially different, and/or the method or machinery used to perform the shredding or grinding is also different.

As noted above, cellulose and plastic materials may be received (act 102) in connection with other materials, including, by way of example and not limitation, biological or hazardous materials. Accordingly, it may be desirable, in some embodiments, to optionally sanitize the cellulose and/or plastic materials (act 112). As illustrated in FIG. 1, sanitization (act 112) of the cellulose and/or plastics materials can occur after such materials are ground or shredded (acts 106, 108) although it will be appreciated that this optional step can be performed at any suitable time within reclaiming process 100, and is not limited to being performed after the plastic and/or cellulose materials have been shredded or ground (acts 106, 108). For example, in another embodiment, cellulose and/or plastic byproducts can be sanitized after such materials are sorted, and before they are shredded or ground. In still another embodiment, sanitization can be performed after cellulose and plastic materials are blended together (act 114). In yet another embodiment, sanitization 112 of plastic and/or cellulose materials is omitted entirely.

In FIG. 1, following the optional shredding or grinding (acts 106, 108) and sanitizing (act 112) of the cellulose and plastic materials, reclaiming process 100 includes an act 114 of blending the shredded or ground materials. This process may combine cellulose materials and plastic materials as received, in the same proportion as received. In other embodiments, however, the proportion of the cellulose and plastic materials can be tightly or loosely controlled so as to be suitable for a desired application. For instance, according to one embodiment, plastics, by weight, comprise between twenty and ninety-nine percent of the blended material, while cellulose materials comprise, by weight, between one and eighty percent of the blended material. It will be appreciated that these percentages are, however, exemplary only. In other embodiments, for example, more or less plastic and/or cellulose can be included. In still other embodiments, materials other than plastics and cellulose materials can be included in the blended material. Moreover, in still other embodiments, blending of the plastics and cellulose materials, and/or any other materials, can also occur prior to sanitization and/or shredding or grinding of the materials. In this manner, the acts 106, 108 of shredding or grinding cellulose materials and plastics can, in some embodiments, be combined into a single act.

After blending and shredding or grinding the cellulose and plastic materials, the blended mixture can be used in a variety of manners. As illustrated in FIG. 1, for example, the blended mixture can then be fed into an energy converter (act 116). The energy converter into which the blended mixture is fed (act 116) can be of any suitable type, and can produce any desired energy. For instance, according to one embodiment, the blended mixture is fed to a heat generator. The heat generator may operate on a combustion theory and burn the blended materials, or otherwise use the blended materials to produce a heat output. For example, the materials can be fed into a boiler, furnace, or stove and used to heat water, a closed area, or any other desired substance or location. In some cases a combustion-based heating unit may use the blended materials as the principal and/or only type of fuel. In other embodiments, a combustion-based heating unit may use the blended materials to supplement another type of fuel. For example, the blended materials can be used to supplement a coal combustion process.

In one exemplary embodiment, for instance, the blended materials can be fed to a fluidized-bed combustion unit. Such a unit can act as a reactor which efficiently controls the combustion processes. In another embodiment, the blended materials can be fed into a kiln. For instance, the blended materials can be provided as pellets for burning in the kiln of a cement plant or for a ceramic-curing kiln.

It will be appreciated, however, that it is not necessary that the blended material be provided to a combustion-based heat generator. In other embodiments, for example, the blended materials may be provided to a gasifier and used to produce, for example, a synthetic gas. In a gasifier, carbonaceous compounds can be placed under high pressure and temperature to produce a synthetic gas or liquid (known as a syngas) composed principally of CO and $H_2$. The syngas may be used, or converted for use, in any suitable manner. For instance, the syngas can be put through an additional conversion process, such as a complex catalytic conversion process, to produce a wide range of gasses or fluids, including diesel, ethanol, methanol, or other alcohols. Such products are highly valuable in that they generally burn cleaner than the compounds they are derived from. Additionally, such products also generally burn more efficiently in that larger amounts of energy can be produced per pound as compared to the burning of the plastic and cellulose mixture itself.

In an embodiment in which the blended materials are provided to a gasifier, it will be appreciated that any suitable gasifier may be used. For instance, and by way of example only, suitable gasifiers may include fixed bed gasifiers (including co-current fixed bed gasifiers, down draft gasifiers, and updraft gasifiers) or moving bed gasifiers (including circulating fluidized bed gasifiers, entrained flow gasifiers, and fluidized-bed gasifiers).

As briefly noted above, once the plastics and cellulose materials have been blended (act 114) and shredded or ground (acts 106, 108), the blended material can be supplied to the energy converter in its solid form (e.g., as a pellet, briquette, or powder). In some alternative embodiments, such as is illustrated in example reclaiming process 200 of FIG. 2, the blended material can optionally be heated (act 218). Heating the blended material can be desirable, for example, to melt the plastics and/or cellulose material and allow the materials to thereby be mixed so as to evenly distribute the materials and obtain a consistent mixture. A heated material may then be provided to an energy converter (act 116) in liquid form. Alternatively, the heated materials may be provided in a solid form. For instance, heating the materials can allow the plastic materials to melt and act as a bonding agent which allows the blended mixture to then be delivered in a solid form for a variety of other uses as described herein.

To melt the plastics and/or cellulose materials in the blended material, or to otherwise facilitate bonding within the blended material, heating can take place to heat the mixture to any suitable temperature. For example, depending on the type of plastics and/or cellulose materials, it can be desirable in some cases to heat the blended material to between two-hundred eighty and five hundred degrees Fahrenheit. In other embodiments, however, more or less heat can be applied to heat the blended material to a higher or lower temperature, as necessary or as desired.

In other embodiments, it will be appreciated that heating the materials may not be necessary. For example, after the materials are blended and shredded/ground, they may be mixed with an additional binding element. For example, wax, rosin, an adhesive, or some other binding element may be mixed with the blended material to facilitate bonding of the materials to form a solid structure, even in the absence of heating the materials. In still other embodiments, however, the materials are further mixed with a binding element and undergo heating to cause the materials to bind together. In a still other embodiment, the blended plastic and cellulose materials bind in the absence of heat and additional binding elements, such as by being compressed.

Figure 2:
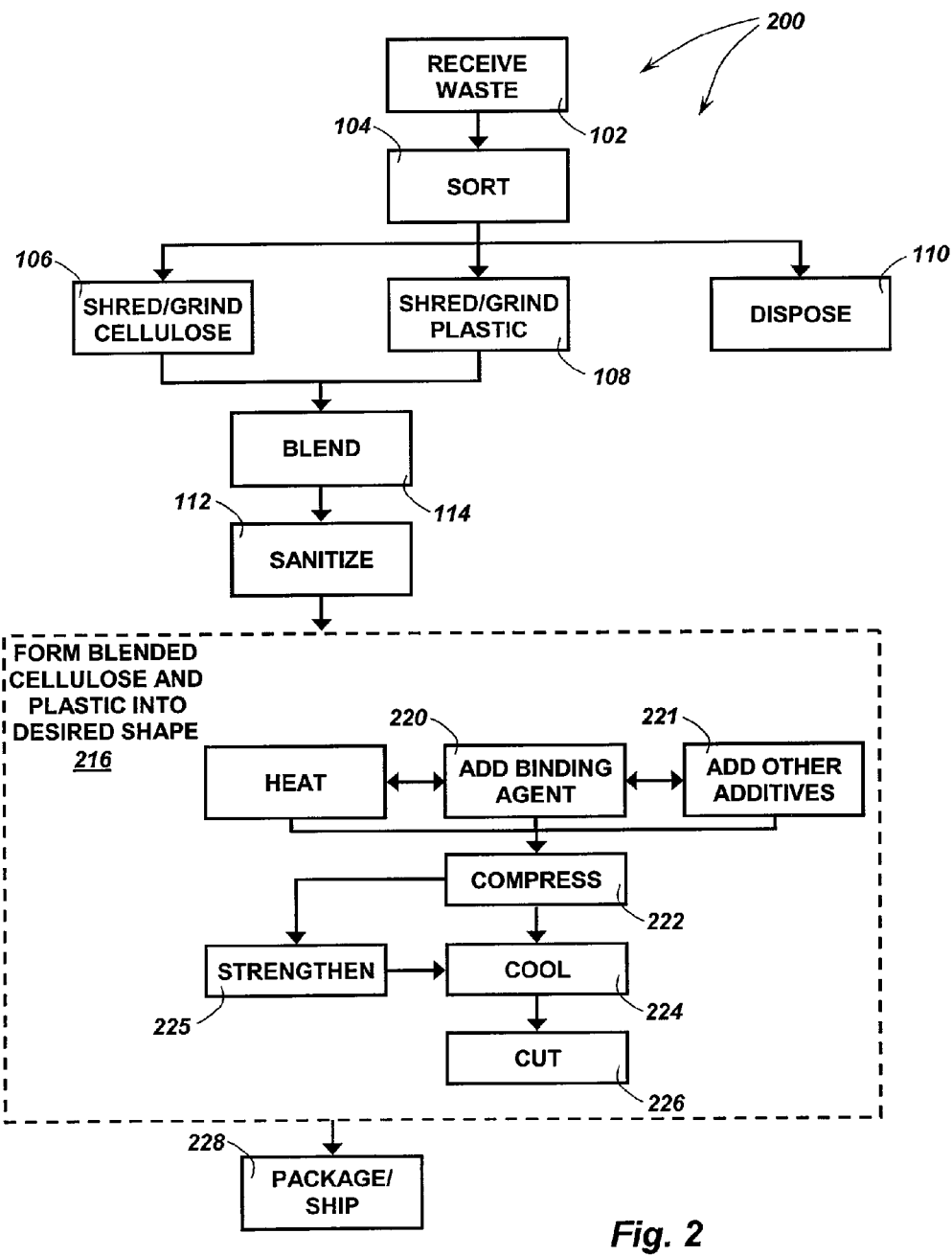
FIG. 2 illustrates an exemplary process for reclaiming plastic and cellulose materials to produce a solid, recycled material usable as an alternative solid fuel or as a structural or insulative material.

Now turning to FIG. 2, an alternative embodiment of a reclaiming process 200 is described. In general, reclaiming process 200 includes acts and steps which may be similar to those described above with respect to reclaiming process 100 of FIG. 1. To simplify the discussion herein, similar acts or steps are reflected with the same reference numbers identified in FIG. 1, and a discussion of such acts or steps will not be repeated. It will be appreciated, however, that the exemplary reclaiming processes 100 and 200 should not, however, be interpreted to necessarily include all of the elements of the other, or to require that similar elements be performed in any particular order. For instance, in FIG. 2, the optional act of sanitizing the cellulose and/or plastic materials (act 112) can occur following blending of the materials (act 114), rather than before blending as illustrated in FIG. 1.

It will be appreciated that sanitizing the materials at different times can provide different advantages. For example, one feature of sanitizing (act 112) materials following blending is that the same process may be used for the combined plastic and cellulose materials, which may simplify the process. On the other hand, it may be desirable, in some applications, to sanitize plastic and cellulose materials in different manners. For instance, one sanitization chemical or process may be better suited for plastic than cellulose, or vice versa. By sanitizing the plastic and cellulose separately, optimal sanitization may be better available to make use of the best processes for each material.

With continued reference to FIG. 2, exemplary reclaiming process 216 can include an optional step for forming blended cellulose and plastic into a desired shape (step 216). For example, as discussed above, step 216 can optionally include an act of heating the blended cellulose and plastic (act 218). While heating 218 can be performed following blending 114 of the plastic and cellulose materials, it should be appreciated that heating may optionally occur prior to blending as well.

In the case of the illustrated reclaiming process 200, either before, during or after heating the blended material (act 218), step 216 can include the adding of a binding agent (act 220). As noted above, any suitable binding agent can be used, including, by way of example only, wax, rosin, an adhesive, or some other binding agent. In still other embodiments, step 216 can also, or alternatively, include an optional step of adding other additives (act 221). For example, as described in greater detail hereafter, the binding agent may be augmented by, or replaced with, fiberglass, metal, or a structural material. Such materials may optionally provide a reclaimed material with improved structural properties. In another example, and as also described in greater detail herein, an additional additive may be added to the blended mixture so as to reduce the emission of noxious or toxic gasses in the event the blended mixture is burned. In still another embodiment, additives can be added to improve other attributes of the construction materials. For instance, mechanical properties or attributes beyond mechanical properties can be improved. In one example, additives can be added which improve the fire resistance and/or the resistance of the formed object to insects and/or mold.

After heating the blended cellulose and plastic materials, step 216 can further include an act of compressing the materials (act 222) to form a solid object. Compression 222 can occur alone, or can be performed within another one or more acts, such as when the blended mixture is cooled (act 224) and/or cut (act 226). Furthermore, compression of the blended mixture (act 222) may include not only compressing the materials, but also shaping, molding, or extruding the blended mixture. For example, compression 222 may include an extruding process by using, by way of representation and not limitation, a screw action extruder (e.g., a twin or single screw action extruder). Compression 222 can alternatively, or additionally, occur in a hydraulic press where it is compressed to form a desired shape. Further, compression 222 may occur, by way of example only, in compression molding equipment or air pressure/pneumatic devices, which mold the blended mixture into a desired shape. In any such compression method, the blended mixture may be compressed with a pressure which varies from atmospheric pressure. For example, a compression process 222 may compress the blended mixture at any pressure between two hundred pounds per square inch and five thousand pounds per square inch, although lesser or greater pressures may also be applied as necessary or desired.

In some embodiments, and as noted above, a method 200 for reclaiming cellulose and plastic materials can further include cooling (act 224) the blended mixture. As illustrated in FIG. 2, cooling 224 the blended mixture of reclaimed plastic and cellulose can, in some embodiments, occur after the mixture has been compressed and optionally formed, molded, extruded, or shaped as desired. Cooling 224 may also occur during compression, as described above, and in any suitable manner. For example, cooling may be performed by allowing the mixture to air dry, or by using a fan or blower, refrigeration unit, water cooled process, or other suitable cooling method.

Additionally, blended objects produced by compressing 222 the mixture may, in some embodiments, be further shaped for a desired application. In such an embodiment, the blended object made of reclaimed cellulose materials and plastics can, even if already formed by compression 222, be cut to a desired length, size or shape (act 226). In embodiments in which the blended object is cooled (act 224), cutting 226 the blended object can occur before cooling 224 or after cooling 224, as desired. Thereafter, the blended object that has been cut or shaped as desired, can be packaged, shipped, and/or used as desired (act 228).

As noted above, reclaimed materials can thus be formed or shaped into a variety of objects which can be used in any number of applications. In one embodiment, for example, reclaiming process 200 forms blended objects of reclaimed plastic and cellulose material in the shape of logs, bricks, briquettes, pellets, or the like. These objects can then be placed in a stove, oven, furnace, boiler, or the like and can be burned. For example, such an object can be used and burned within a fireplace or kiln to generate heat.

As noted above, in one embodiment, additives may be added to the blended mixture (act 221), such as during forming of the mixture into the final product, or even before the mixture is formed into the shape of the final product. For instance, in FIG. 2, additives are added 221 during step 216 during heating of the mixture. In alternative embodiments, however, additives may be added 221 before heating and even before or during blending 114 of the cellulose and plastic.

In any such embodiment, the additives added in act 221 may be of a material or component which facilitates the reduction of the emission of noxious or toxic gasses in the event that the produced product is burned. For example, materials such as crushed limestone, lime, clay materials, burnt clay materials, inorganic fine materials, or other suitable materials may be added. One feature of such materials is that emission of certain gasses can be reduced or eliminated. For instance, such materials may reduce the amount toxic or noxious gasses produced by the burning of the blended mixture itself and/or from another fuel (e.g., coal). In one example, the amount of sulfur gasses and/or mercury content that would otherwise be released if the produced material were burned may be reduced. Accordingly, the addition of such additives and materials (act 221) can reduce unwanted pollution from exhaust streams of combustion systems or other systems which use the produced blended product.

It will be appreciated that while the blended object can be formed and/or used as fuel, the formed object made of reclaimed plastics and cellulose materials can be used in structural aspects. For example, the plastic and cellulose blended object can be shaped, extruded, or molded for use as a fence post or parking chuck. Similarly, objects formed of reclaimed material can be produced for use as building materials, including studs, posts, beams, decking, joists, columns, wall panels, siding, flooring, sheathing, retaining walls, bricks, slabs, blocks, and the like. The materials can also be used for landscaping or walkway uses. For instance, the blended objects can create tiles or other objects usable as walkways or driveways. They can also be used to create lawn and landscape edging and railway ties. Similarly, blended objects can be formed for use as erosion control coverings, dams, or as marine structures (e.g., wharfs or docks). Seismic resistant wall structures can also be comprised of such blended objects.

Whether used as a structural element, fuel element, or for any other purpose, it will be appreciated that the blended and reclaimed cellulose and plastic materials can be formed to be in virtually any shape and/or size. For instance, FIGS. 3A-3G illustrate frontal views of exemplary beams 300a-300g formed from reclaimed plastic and cellulose. As illustrated in FIGS. 3A-3G, the exemplary methods disclosed herein can be used to create a beam of a simple shape or a complex geometric shape, such that virtually any shape is possible. For instance, in FIGS. 3A and 3B, reclaimed plastic and cellulose materials are formed into beams 300a, 300b having generally square-shaped and generally rectangular-shaped cross sections, respectively. Other relatively simple cross-sectional shapes such as a circular cross section (e.g., beam 300d of FIG. 3D) or a trapezoidal cross section (e.g., beam 300e of FIG. 3E) may also be formed.

Figure 3A:
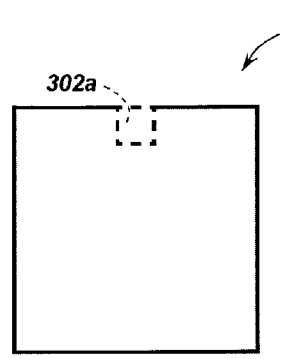
FIGS. 3A-3G illustrate frontal views of solid, recycled materials in various shapes which may be produced by the exemplary process of FIG. 2.
Figure 3B:
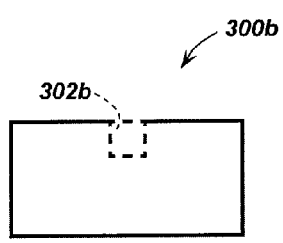
Figure 3C:
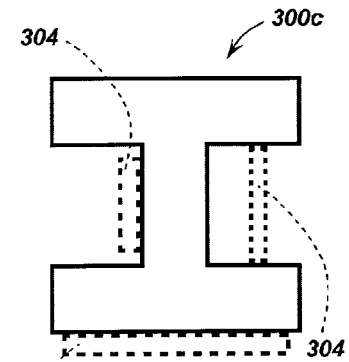
Figure 3D:
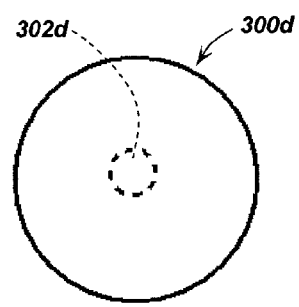
Figure 3E:
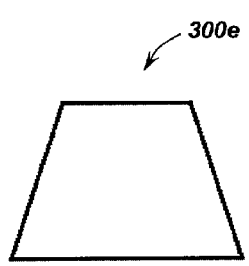
Figure 3F:
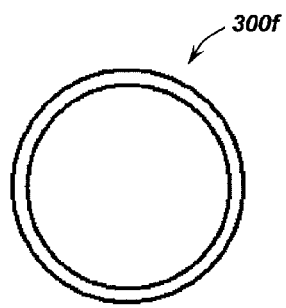

As further illustrated in FIG. 3C, reclaimed plastic and cellulose may further be formed to form a slightly more complex shape, such as I-beam 300c. In still other embodiments, a beam may be formed as a hollow tube, such as hollow tube 300f of FIG. 3F. It will be further appreciated that while tube 300f is generally circular, a hollow tube may be formed with any other suitable shape. For example, a generally hollow beam 300g may be formed to have a more complex shape, according to yet another embodiment. For instance, beam 300g can be formed as a generally hollow rectangular tube having an opening centered on one side and a groove 302g centered on an opposing side. Beam 300g is, however, merely an example to show that a beam can be formed to have virtually any size or shape. Shaping of the materials in this manner can be provided in any suitable manner, using any suitable equipment, For instance, as described herein, forming and shaping of such materials can be performed by extruding, molding, cutting, turning, and/or compressing blended plastic and cellulose into a desired shape. Additionally, beams of any shape may also be obtained by combining two or more beams of other, possibly simpler, shapes. For example, two beams may be connected to form a beam of a complex shape through the use of mechanical fasteners, adhesives (e.g., epoxy), or any other suitable connection means.

Returning now to FIG. 2, it will be seen that in some embodiments, the step for forming blended cellulose and plastic into a desired shape (step 216) can also include an act of strengthening the formed material (act 225). The formed material may be strengthened in any suitable manner, and no particular manner for strengthening the material is necessary or preferred. For instance, in the embodiment illustrated in FIG. 2, the formed material is strengthened 225 during step 216 for forming blended cellulose and plastic into a desired shape. Specifically, in the illustrated embodiment, the formed material is strengthened after compression 222 of the blended mixture and before or during cooling 224 of the formed. In other embodiments, however, the blended mixture may be strengthened at other times, such as after cooling 224 and/or after cutting 226. In still other embodiments, and as noted previously, strands of fiberglass may be added to the blended mixture before compressing and shaping the mixture into a solid form. The added fiberglass, or any other suitable material, can be added in any proportion (e.g., between two and twenty percent of the final product, by weight), and used to improve the strength or other mechanical properties of the formed mixture.

Figure 3G:
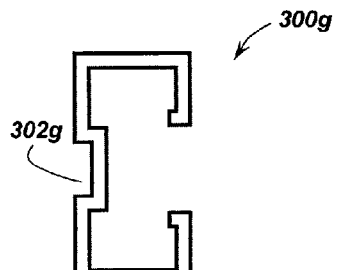

In still other embodiments, the material may be compressed, extruded, molded, or otherwise shaped in a manner that allows a manufacturer or user to determine how and whether to strengthen the materials. For instance, as illustrated in FIGS. 3A, 3B and 3G a beam 300a, 300b, 300g may optionally be formed with a groove 302a, 302b, 303g in an external surface of the beam. After the beam is formed 316, another material may be inserted into groove 302a, 302b, 302g. For instance, a metal (e.g., iron or steel), glass or carbon composite or wood rod may be inserted into the groove to reinforce the beam. In other embodiments, a rod formed of reclaimed plastic and cellulose, and which has different proportions of components, may be inserted into the groove. In any event, by adding a rod to the groove, the overall mechanical properties of the beam may be changed and improved for a particular application. For instance, by adding a rod to the beam, the tensile and/or compressive strength of the beam may be improved. Additionally, or alternatively, the added rod may improve the beam's torsional strength, thereby increasing the ability of the beam to withstand a twisting load It will be appreciated that a groove or slot can be added to a formed material regardless of is shape. Accordingly, while grooves 302a, 302b and 302g are illustrated on generally square and rectangular beams, a groove or slot can be formed on any of the illustrated beams, or on a beam of any other cross-sectional shape. Moreover, grooves or slots may be formed in different positions and in any number in the formed material. For instance, in FIG. 3D, a hole 302d is formed in the interior of beam 300d. Thus, it will be appreciated that a groove does not need to be formed to intersect an outer surface of the formed material, but can instead be a hole through which a strengthening or other material is inserted. Additionally, while a groove or hole may be formed during basic extrusion or other shaping of the beam, such a feature may alternatively be cut into the beam at a later time. Thus, shaping of a beam to include a groove or hole may occur in a single shaping process, or during two or more separate processes.

Furthermore, while FIGS. 3A, 3B, 3D and 3G illustrate a single groove or hole that is centered along a side or within the formed material, such features are merely exemplary. Indeed, grooves or holes can be placed at any location, including a location offset from a center of a side or the center of the beam, and/or can be added in any number. For example, two or more grooves, slots, or holes can be formed in a beam of any shape. Based on the location and/or number of the grooves, slots or holes, the formed material can have one or more rods inserted to reinforce and strengthen the building material, and to provide a material having any of a variety of different material properties. Thus, a user can insert a rod or other strengthening member in any or all of the included grooves, slots or holes on a beam to obtain a beam with the desired properties.

As noted above, strengthening 225 the blended mixture can be performed in any suitable manner. In FIG. 3C, for example, one or more plates 304 can optionally be affixed to beam 300c. By affixing plates 304 to beam 300, an effect similar to the use of rods in a groove or hole may be obtained. In particular, the added plates can reinforce a beam and change and improve mechanical properties of the overall beam. In adding such a plate 304, or a rod as described above, it is not necessary that the reinforcement actually change or increase the tensile, compressive, or torsional strength of the beam, although such may be desired in some applications, and that strengthening or reinforcing a beam may change any of a variety of other mechanical properties as well.

As will be appreciated in view of the disclosure herein, one or more plates 304 can be affixed to beam 300c (or to any of beams 3A, 3B, and 3D-3G) in any suitable manner. For example, in one embodiment, such as that illustrated in FIGS. 4A and 4B, a reinforcement strap or plate 404 is affixed to one side of beam 400. In the illustrated embodiment, plate 404 runs along substantially the full length of beam 400, although in other embodiments plate 404 may be added to only selected portions of beam 400. In this embodiment, plate 404 is connected to beam 400 by using with an adhesive layer 406 between plate 404 and beam 400. Additionally, one or more mechanical fasteners 408 may also be used to further secure plate 404 to beam 400. Such mechanical fasteners 408 may each be of the same or different type, such that any combination of mechanical fasteners (e.g., nails, stables, screws, bolts, prongs, dowels, rivets, cotter pins, and the like) may be used, either with or without adhesive later 406. When mechanical fasteners 408 are used, it will also be appreciated that plate 404 may be affixed to the beam 400 while the beam is still hot, such as after heating and compression as described herein, or after beam 400 has cooled. In the case where plate 404 is affixed while beam 400 has an elevated temperature, it will be appreciated that insertion of the fastener into the beam may be made easier as the beam material may be more flexible to allow for easier penetration of the mechanical fastener, and may even then affix to the fastener as the beam cools.

In some cases, the fastener may be integral with plate 404 as well. For example, plate 404 may be made of a metal which has protruding prongs which grip into beam 400. The protruding prongs may be made by punching a half-circular device through the metal plate 404, with the protruding prongs being left to stick out of plate 404. The plate 404, including any protruding prongs, may then be pressed against beam 400 and can penetrate beam 400 to secure plate 404 thereto. While such prongs may more easily penetrate beam 400 when beam 400 is hot or warm, such prongs may also be sharp enough to at least partially penetrate beam 400 even when beam 400 has cooled.

In other embodiments, however, plate 404 may be affixed to beam 400 or other structural material without adding any adhesive layer 406 and/or without mechanical fasteners 408. For instance, in one example, plate 404 is forcibly applied to beam 400 while beam 400 is hot. As the force is applied, plate 404 may cause a groove to form in beam 400, and plate 404 can be secured within the groove. In other embodiments, the groove is at least partially shaped into the beam during compression 222 (FIG. 2). The plastic and/or binding agent of the beam may bond to the plate 404 and secure it in place as beam 400 cools. In other embodiments, no groove may be formed for the plate, such that by forcing one or more of plates 404 against the uncooled beam 400 or beam 300c (FIG. 3C), a groove may not be formed, or may be largely imperceptible. Instead, the plastic, bonding agent, or other components of the beam may nonetheless secure the plate 404 to beam 400 as beam 400 cools.

As with the use of rods to reinforce a beam or other building material, a plate 400 may be made of any suitable material, including iron, steel, glass, carbon-reinforced composite, wood, or the like, and may be affixed to a beam in any number and at any suitable location. Thus, a plate 304, 404 can be affixed to a single surface of a beam (such as in FIGS. 4A and 4B), which surface may be vertical, horizontal or inclined. In other cases, plates 304, 404 may be attached to any number of surfaces that may be external to a beam or internal to the beam. In other embodiments, the plate may not be affixed to two flat surfaces. For example, as shown in FIG. 3C, a plate 304 may be inserted between, and affixed to, two horizontal, interior surfaces on the horizontal cross-strokes of the I-beam 300c. In another embodiment, such as that illustrated in FIG. 5, a plurality of plates 504 can be placed on multiple, external surfaces of a beam 500. In the illustrated example, for instance, each of three plates 504 are secured around one side of a rectangular beam. It will be appreciated, however, that more or fewer surfaces of beam 500 can also have a plate 504 secured thereto. For instance, in one example, each side of rectangular beam 500 may have a plate 504 secured thereto, while in another example, only two adjacent or opposing sides of beam 500 may have a plate 504 secured thereto.

It will thus be appreciated that objects formed of blended plastic and cellulose materials as described herein can be strengthened in any number of manners. Further, such objects can be strengthened or reinforced as desired for situations in which it is beneficial for reinforcement to handle the type, intensity or duration of the loading on the beam. An additional component, or alternatively a different proportion of materials within a beam, can thus improve both axial and bending capacities of a wide range of products. Specifically, a reinforced or otherwise strengthened beam or blended object may thus be made to have a greater bending capacity, exhibit less short-term and/or long-term deflection when loaded as a beam or column, and/or have a greater capacity to resist horizontal shear forces imposed by applied bending loads.

Thus, optional strengthening or reinforcing of a blended object described herein greatly increases the number of possible applications of plastic and cellulose composite products by offering such products with a wider range of mechanical properties. It will also be appreciated that such properties can be further varied by modifying the dimensions (e.g., thickness, width, length, diameter, etc.) of a reinforcement member, the manner in which the reinforcement member is attached to the blended object (e.g., in a groove, with an adhesive such as, but not limited to, epoxy, or with different mechanical fasteners of differing sizes and/or spacing)

As noted herein, objects made from blended mixtures can be formed for use in various applications, including for use as fuels or construction supplies. In other embodiments, additional applications are contemplated. Furniture can, for example, be produced with the blended materials. For instance, planks and boards can be produced to build furniture, or the blended material can be compressed and molded (e.g., injection molding, insertion molding, blow molding) to form a particular type of furniture or another object. In addition, the produced objects can be used as sound barriers in music studios, homes, on roadway sound walls, or for use with other structures. In still another embodiment, the materials can be used as an insulation material to prevent heat or reduce heat flow.

The present invention may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. A method for reclaiming waste by-products, comprising:
   receiving waste from a municipal waste stream, the received waste including at least cellulose materials and plastic materials;
   blending said cellulose materials and said plastic materials of said received waste to produce a blended mixture of reclaimed materials;
   after blending said cellulose materials, forming said blended mixture of reclaimed materials into a structural member, wherein forming said blended mixture includes:
      heating said blended mixture of reclaimed materials; and
      compressing said blended mixture of reclaimed materials to form said structural member, wherein said structural member is configured to resist one or more loads and includes a plurality of grooves or holes; and
   customizing reinforcement of said structural member by affixing at least one reinforcement member in any one of said plurality of grooves or holes to obtain one or more desired mechanical properties in said structural member.

2. A method as recited in claim 1, wherein forming said blended mixture further comprises:
   adding a binding agent to said blended mixture of reclaimed materials.

3. A method as recited in claim 1, wherein compressing said blended mixture comprises one or more of: extruding, molding, forming, or shaping.

4. A method as recited in claim 1, the method further comprising:
   after compressing said blended mixture, cooling said blended mixture and cutting said structural member to a desired length.

5. A method as recited in claim 1, further comprising:
   affixing one or more reinforcement straps to an outer surface of said structural member.

6. A method as recited in claim 1, further comprising:
   affixing one or more plates to an outer surface of said structural member, wherein at least one of said one or more plates includes protruding prongs.

7. A method as recited in claim 1, wherein said structural member comprises a structural beam.

8. A method as recited in claim 7, further comprising:
combining said structural beam with a second beam to form a composite beam.

9. A method as recited in claim 1, further comprising:
adding a strengthening structure to said blended mixture before compressing said blended mixture.

10. A method as recited in claim 9, wherein said strengthening structure is strands of fiberglass or one or more composite rods.

\* \* \* \* \*